(12) United States Patent
Ramaswamy et al.

(10) Patent No.: US 7,016,827 B1
(45) Date of Patent: Mar. 21, 2006

(54) METHOD AND SYSTEM FOR ENSURING ROBUSTNESS IN NATURAL LANGUAGE UNDERSTANDING

(75) Inventors: Ganesh N. Ramaswamy, Ossining, NY (US); Kyle A. Jamieson, Hopewell, NJ (US); Jan Kleindienst, Kladno-Krochehlavy (CZ)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/390,308

(22) Filed: Sep. 3, 1999

(51) Int. Cl.
*G06F 17/27* (2006.01)

(52) U.S. Cl. .............................. 704/9; 704/1; 704/270; 704/275; 704/257

(58) Field of Classification Search .................... 704/1, 704/9, 270, 275, 257
See application file for complete search history.

(56) References Cited

U.S. PATENT DOCUMENTS

| | | | | |
|---|---|---|---|---|
| 5,239,617 A | * | 8/1993 | Gardner et al. ................ | 706/11 |
| 5,255,386 A | * | 10/1993 | Prager ............................ | 707/5 |
| 5,418,717 A | * | 5/1995 | Su et al. ......................... | 704/9 |
| 5,638,486 A | | 6/1997 | Wang et al. | |
| 5,748,974 A | * | 5/1998 | Johnson ......................... | 704/9 |
| 5,867,817 A | | 2/1999 | Catallo et al. | |
| 5,987,404 A | * | 11/1999 | Della Pietra et al. ........... | 704/9 |
| 5,991,710 A | * | 11/1999 | Papineni et al. ................ | 704/2 |
| 6,092,034 A | * | 7/2000 | McCarley et al. .............. | 704/2 |
| 6,243,677 B1 | * | 6/2001 | Arslan et al. ................ | 704/244 |
| 6,278,967 B1 | * | 8/2001 | Akers et al. .................... | 704/2 |

FOREIGN PATENT DOCUMENTS

| | | |
|---|---|---|
| CA | 1246229 | 12/1988 |
| GB | 2344917 | 6/2000 |
| WO | WO 0039788 | 7/2000 |

OTHER PUBLICATIONS

Schaaf et al., "Confidence Measures for Spontaneous Speech Recognition," IEEE International Conference on Acoustics, Speech and Signal Processing, Munich, Apr. 1997.
Papineni et al., "Feature-Based Language Understanding," Eurospeech, Rhodes, Greece, Sep. 1997.
Ward et al., "Towards Speech Understanding Across Multiple Languages," International Conference on Spoken Language Processing, Sydney, Australia, Dec. 1998.
Wessel et al., "Using Word Probabilities as Confidence Measures," IEEE International Conference on Acoustics, Speech and Signal Processing, Seattle, May 1998.

\* cited by examiner

*Primary Examiner*—David D. Knepper
*Assistant Examiner*—Qi Han
(74) *Attorney, Agent, or Firm*—F.Chau & Associates,LLC

(57) ABSTRACT

A method and system, which may be implemented by employing a program storage device readable by machine, and tangibly embodying a program of instructions executable by the machine to perform method steps for ensuring robustness of a natural language understanding (NLU) system, includes tagging recognized words of a command input to the NLU system to associate the command with a context, and translating the command to at least one formal command based on the tagged words. A top ranked formal command is determined based on scoring of the tagged recognized words and scoring translations of the at least one formal command. Whether the top ranked formal command is accepted is determined by comparing a feature vector of the top ranked formal command to representations of feature vectors stored in an accept model. The top ranked formal command is executed if accepted and incorrect commands are prevented from execution to provide a robust NLU system.

42 Claims, 7 Drawing Sheets

```
Sentence #408   Correct 0.846709646214
DEC: close_folder( name="message log" )
COR: close_folder( name="message log" )

TDEC: [CLOSE close CLOSE] the [FNAME message log FNAME] [FOLDER folder FOLDER]
TCOR: [CLOSE close CLOSE] the [FNAME message log FNAME] [FOLDER folder FOLDER]
Complete match 1. CLOSE the FNAME FOLDER (Tagging score: 0.873911)
    1   0.96887374      close_folder( name=FNAME )
    2   0.011986108     close_folder( folder=current )
    3   0.005749428     close_object( object=current )
    4   0.0053696297    open_folder( name=FNAME )
    5   0.0030040044    close_window( window=current )

2. CLOSE the MSG FNAME FOLDER (Tagging score: 0.03781)
    1   0.791468        close_folder( name=FNAME )
    2   0.15737012      close_message_window( message=current )
    3   0.025178693     close_folder( folder=current )
    4   0.006940578     close_window( window=current )
    5   0.004540644     close_application( application=mail )

3. CLOSE the FNAME (Tagging score: 0.00714398)
    1   0.84850997      close_folder( name=FNAME )
    2   0.1393669       close_object( object=current )
    3   0.0047025573    open_folder( name=FNAME )
    4   0.002893546     close_window( window=current )
    5   0.001893007     close_application( application=mail )
```

METHOD AND SYSTEM FOR ENSURING ROBUSTNESS IN NATURAL LANGUAGE UNDERSTANDING

BACKGROUND OF THE INVENTION

1. Field of the Invention

The present invention relates to computer systems with natural language understanding capabilities, and more particularly to a method and system for ensuring robustness for these systems.

2. Description of the Related Art

For computer systems with natural language understanding (NLU) capabilities, errors can be made by the system in translating the user's input, resulting in an incorrect action being executed by the system. Presently, a typical natural language understanding system which receives a command which is incorrect carries out the command. If the system carries out this action, problems may be encountered. For example, data may be changed, memory updated or erased, or other detrimental events may occur. The occurrence of these events may require undoing the previous command or redoing a sequence of commands to return the system to a desired state. This results in lost time and annoyance of the user.

Therefore, a need exists for a system and method for ensuring robustness in natural language understanding by determining incorrect commands and preventing their execution.

SUMMARY OF THE INVENTION

A method, which may be implemented by employing a program storage device readable by machine, and tangibly embodying a program of instructions executable by the machine to perform method steps for ensuring robustness of a natural language understanding (NLU) system, includes tagging recognized words of a command input to the NLU system to associate the command with a context, and translating the command to at least one formal command based on the tagged words. A top ranked formal command is determined based on scoring of the tagged recognized words and scoring translations of the at least one formal command. Whether the top ranked formal command is accepted is determined by comparing a feature vector of the top ranked formal command to representations of feature vectors stored in an accept model. The top ranked formal command is executed if accepted and incorrect commands are prevented from execution to provide a robust NLU system.

In other methods, which may be implemented by employing the program storage device, the step of determining a top ranked formal command may include the step of ranking formal commands based on a product of scores of the tagged words and scores of translations of the at least one formal command. The step of determining a top ranked formal command may include the step of ranking N formal commands where N is a selectable system parameter. The step of determining whether the top ranked formal command is rejected by comparing the feature vector of the top ranked formal command to feature vector representations stored in a reject model may be included. The step of providing the reject model by including representations of feature vectors of formal commands corresponding to words or sentences to be rejected may also be included.

The reject model may include a cluster of models. The step of clustering the cluster of models based on at least one of mistakes in commands, mistakes in arguments of the command, and processing mistakes may further be included. The method steps may include providing the accept model by including representations of feature vectors of formal commands corresponding to words or sentences to be accepted. The step of determining whether the top ranked formal command is accepted may include the step of computing a probability of acceptance for the command. The step of computing a probability of acceptance for the command may include the steps of computing a probability of rejection for the command and comparing the probability of acceptance to the probability of rejection to determine if the command is to be executed. The step of computing a probability of acceptance for the command may include the step of comparing the probability of acceptance to a threshold probability to determine if the command is to be executed. The threshold may be modified by the user.

In other method steps, the accept model may include a cluster of models. The step of clustering the cluster of models based on at least one of mistakes in commands, mistakes in arguments of the command, and processing mistakes may be included. The step of preventing incorrect commands from execution to provide a robust NLU system, may include executing a do nothing command responsive to the incorrect commands.

A method for building an evaluation corpus for checking commands in a natural language understanding (NLU) system includes providing a training corpus of words and sentences. The words and sentence have a user input form and a corresponding formal command associated with the user input form. At least some of corresponding formal commands include a do nothing command for incomplete and/or incorrect commands. The words and sentences of the training corpus are passed to the natural language understanding system to determine a top ranked command. The top ranked command is compared to the corresponding formal command to determine if a match exists. If a match exists, the word or sentence is placed in the accept corpus, otherwise in the reject corpus. Features from the words or sentences of the accept corpus and the reject corpus are extracted to construct a feature vector for each word or sentence, and an accept model and a reject model are constructed from the extracted feature vectors.

In other methods, the feature vectors may include tagging scores for recognized words of the word or sentence represented by the feature vectors or translation scores for formal commands associated with the word or sentence represented by the feature vector. The feature vectors may include a do nothing score associated with words and sentences. The do nothing score indicates a probability that the do nothing command is present for associated words and sentences. The feature vectors may include a top command similarity measure for counting identical formal commands, and/or a parameter mismatch feature for measuring a number of command arguments in a translation of a command. The method may further include the step of clustering feature vectors according to selected characteristics and conditions to provide at least one of a cluster of accept models and a cluster of reject models. The accept model and the reject model may consist of mean vectors and covariance matrices of feature vectors representing the words and sentences and a number of words and sentences stored in the model.

A natural language understanding (NLU) system includes a tagger adapted for tagging recognized words of a command input to the NLU system to associate the command with a context, and a translator adapted for translating the command to at least one formal command based on the tagged words. A robustness checker is included for determining a top ranked formal command based on scoring of the tagged recognized words and scoring translations of the at least one formal command. The robustness checker determines whether the top ranked formal command is accepted by comparing a feature vector of the top ranked formal command to feature vector representations stored in an accept model. A command executor executes the top ranked formal command if accepted and prevents incorrect commands from execution to provide a robust NLU system.

In alternate embodiments, the top ranked formal command may be ranked based on a product of scores of the tagged words and translation scores of the at least one formal command. The top ranked formal command may be selected from a ranked list of N formal commands where N is a selectable system parameter. An accept model for storing feature vector representations of accept commands may be included, and the feature vector representations may be employed to determine an acceptance probability of formal commands. The accept model may include a cluster of models. The system may include a reject model for storing feature vector representations of reject commands. The feature vector representations are employed to be compared to a rejection probability of formal commands. The reject model may include a cluster of models. The robustness checker may include a feature extractor for extracting feature vectors from the command input. The feature vectors may include tagging scores for recognized words of a word or sentence represented by the feature vector and/or translation scores for formal commands associated with the word or sentence represented by the feature vector. The feature vectors may also include a do nothing score associated with words and sentences. The do nothing score for indicates a probability that a do nothing command is present for associated words and sentences. The do nothing command is associated with incomplete or incorrect commands which may be input as a command. The feature vectors may include a top command similarity measure for counting identical formal commands and/or a parameter mismatch feature for measuring a number of command arguments in a translation of a command. The robustness checker may include a robustness evaluator for determining whether the top ranked formal command is accepted by comparing the top ranked formal command to feature vectors stored in an accept model.

A natural language understanding system includes a corpus of rejectable commands corresponding to incorrect commands capable of being input by a user and do nothing commands corresponding to the incorrect commands input to the system which maintain the system in an idle state and/or prompt the user to input a response.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 2 is an illustrative example of output from a tagger and a translator in accordance with the present invention;

DETAILED DESCRIPTION OF PREFERRED EMBODIMENTS

Figure 1:
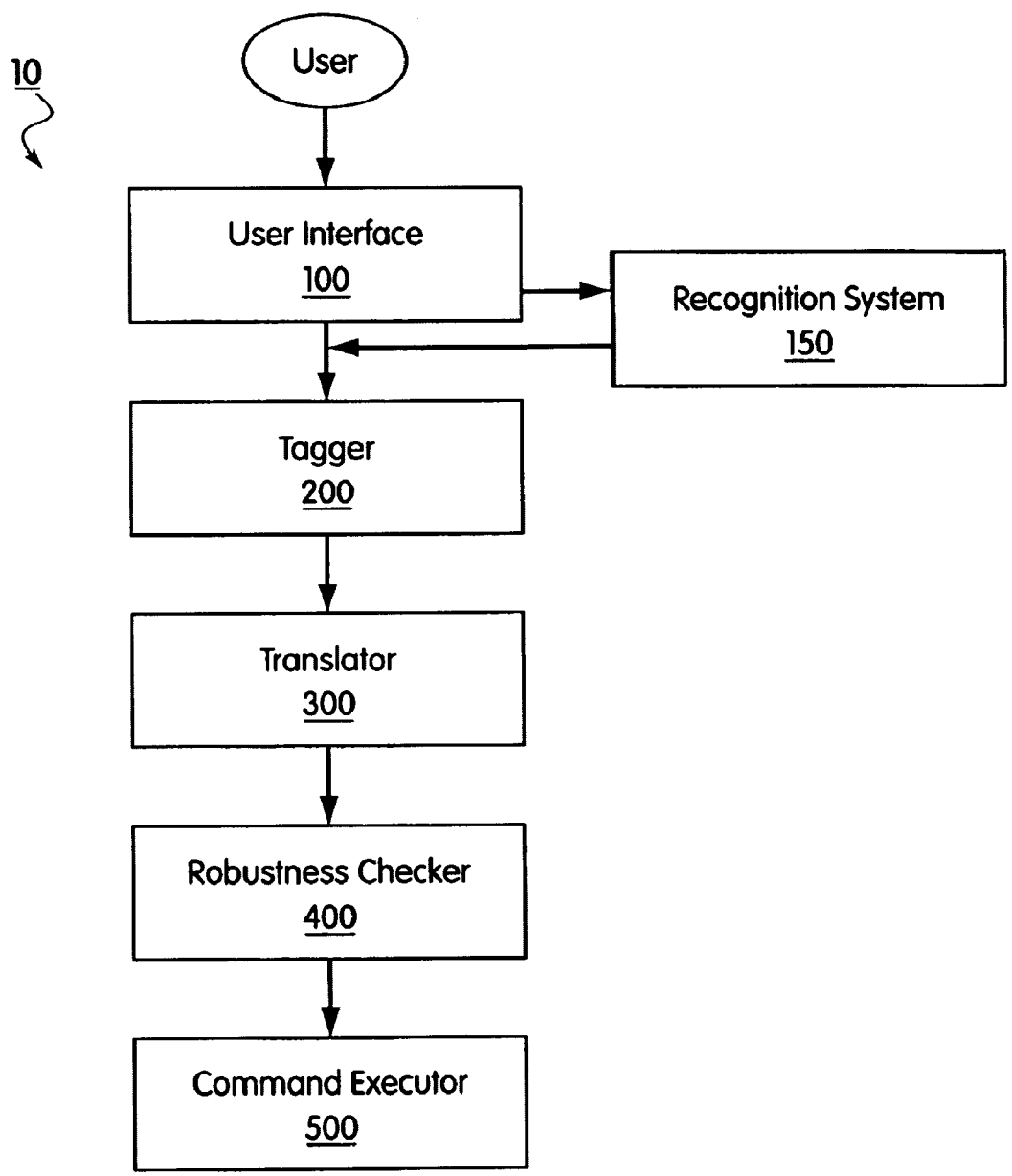
FIG. 1 is a block/flow diagram of a system/method for a natural language understanding (NLU) system employing a robustness checker in accordance with the present invention.

The present invention ensures robustness in computer systems by automatically recognizing the inputs that are likely to result in an incorrect action, and taking preventive measures. For natural language systems, where a command is misinterpreted or incorrectly given, the present invention determines the incorrectness of the command prior to its execution and takes appropriate action. For example, incorrectly interpreted utterances are identified and mapped to a "do nothing" command, and thus the execution of a potentially incorrect command is avoided. The system can remain idle for a do nothing command or the system may prompt a user for more information.

Although confidence scoring for speech recognition systems is employed in recognizing speech, these solutions do not address the errors caused by the natural language understanding systems, do not use feature extraction based on natural language understanding, and do not have a "do nothing" command built-in explicitly into the system. These solutions are also specific to systems with spoken input only, and are not relevant to systems where the input may have come from another source, such as a typed input or a handwritten input. The present invention accommodates input from a plurality of different sources for example, handwriting recognition devices, speech recognition systems, typed text. Input devices may include a variety of devices such as, telephones, personal digital assistants, computers, etc.

The invention provides a method and apparatus to build a statistically trainable system, which will be called a robustness checker, hereinafter, that is part of a natural language understanding system, and is capable of recognizing user inputs that are likely to have been incorrectly translated by a natural language understanding (NLU) system. The robustness checker is statistically trained using the same training data that is used to build models for the NLU system. The NLU system may include a tagger component and a translator component. When deployed as part of a real-time conversational interface, the NLU systems will produce the best choice, along with N-1 other choices (for a total of N choices) for the formal command corresponding to the user's input. The training data will include utterances for which no legal formal language statement exists, and these utterances will be mapped to a "do_nothing" command.

All the training data that was used to build the NLU models are subjected to the NLU, and on the basis of the results, the training sentences may be divided into two categories: the accept category, and the reject category. The accept category includes all the sentences for which the NLU's first choice of formal command is correct, and the reject category includes all the sentences for which the first choice of formal command is not correct.

A feature vector is computed for each of the utterances. The feature vector may include one or more of the following: tagger scores, translator scores, the normalized score for the "do_nothing" command for each tagging, a command similarity measure of the N choices of formal commands from the NLU, and a parameter mismatch factor between the tagger output and the translator output. For each of the accept and reject categories, statistical models are built using the feature vectors from that category. These models are used by the robustness checker to make a decision on whether to accept or reject a formal command produced by the NLU corresponding to a new user input. When appropriate, more than one model may be built for each category to allow for clustered-modeling.

When deployed as part of a real-time system, the robustness checker will first calculate the feature vector corresponding to each input sentence from the user, and map the formal command produced by the NLU for that input sentence to either the accept category or the reject category. If the formal command is mapped to the accept category, then the formal command is submitted for execution. If the command is mapped to the reject category, then it is rejected and the user may be asked to repeat the input.

It should be understood that the elements shown in FIGS. 1 and 3–7 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a block/flow diagram an NLU system 10 and method employing a robustness checker is shown in accordance with the present invention. A user (or users) submits an input to the system 10 via user interface 100. The input from user may be in text, either typed or recognized from speech or recognized or generated from another medium. The input may also be in spoken/acoustic form or handwritten form. If the input is in text form, such as an input submitted using a computer keyboard or personal digital assistant/telephone keypad, then the text is sent to tagger 200. If the input is not in text form, such as a spoken input or a handwritten input, then the input (from a speaker, acoustic signal or visual signal) is translated to text form using speech recognition or handwriting recognition in block 150. The recognized text is then sent to tagger 200. Techniques for speech recognition and handwriting recognition may be employed as known in the art.

Tagger 200 is responsible for recognizing classes of words and phrases present in the input sentence. For example, in a natural language interface to an electronic mail application, the user's input may be:

forward this message to David

The corresponding output from tagger 200 may be:

forward this message to NAME where "David" has been tagged as "NAME". Tagger 200 may be built using statistical parsing techniques, such as those described in Ward, T., et al., "Towards Speech Understanding Across Multiple Languages," International Conference on Spoken Language Processing, Sydney, Australia, December 1998, incorporated herein by reference.

The output from tagger 200 is sent to translator 300 which will assign the tagged sentence to a formal command. For example, the illustrative sentence described above may be assigned to a formal command of the form:

forward_message(message=current, recipient=NAME)

Translator 200 may be built using the techniques described in Papineni, K., et al., "Feature-Based Language Understanding", Eurospeech, Rhodes, Greece, September 1997, incorporated herein by reference.

Referring to FIG. 2, an illustrative example of the output from tagger 200 and translator 300 is shown. In this example, the user's input is "close the message log folder", and tagger 200 produces three possible tagged outputs 202, and associated scores 204. For example, the first choice of tagger 200 is "CLOSE the FNAME FOLDER" with a score of 0.873911, which also happens to be the correct tagging for this sentence. In this example, for each of the three tagged sentences, the translator 300 produces five choices of formal commands 302 and associated scores 304. The first choice of translator 300 for the first tagged sentence is "close_folder(name=FNAME)" with a score of 0.96887374, which also happens to be the correct translation for this sentence. The selected formal command is "close_folder (name="message log"), with a final score of 0.846709646214, which is calculated as the multiplicative product of the scores from tagger 200 and translator 300. In this example, tagger 200 produces three choices, and translator 300 produces five choices for each of the three choices from tagger 200, for a total of fifteen choices. In the general case, there will be N choices of formal commands, and the value of N is a system parameter.

In one embodiment of the invention, N is fifteen, as in the example given in FIG. 2. The final choice of the formal command is selected using the tagger output and the translator output for which the combined multiplicative score is the highest, and this command will be called the top ranking formal command.

Returning to FIG. 1, the output from the tagger 200 and translator 300, which may be of the form given in FIG. 2, is sent to a robustness checker 400. The robustness checker 400 is responsible for determining if the top ranking formal command should be accepted or rejected. If the command is to be accepted, then it is sent to command executor 500 and the command is executed. If the command is to be rejected, then the command is not executed and the user may have to resubmit the input, perhaps using a different choice of words.

Figure 3:
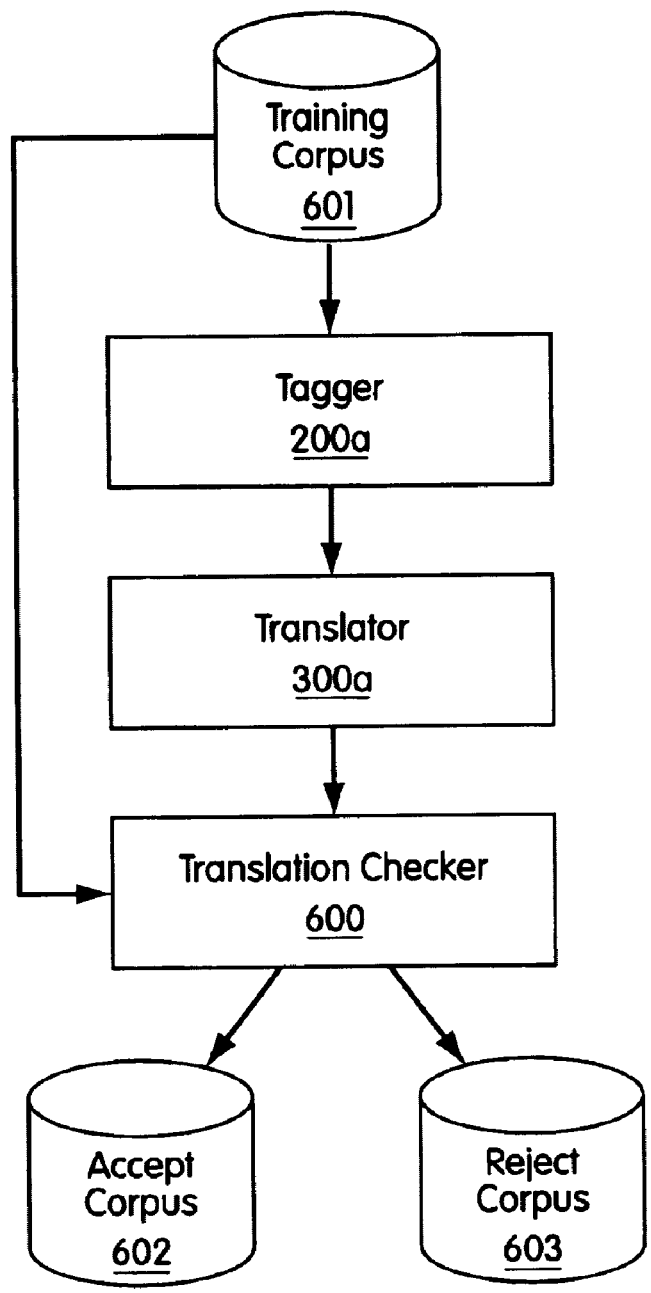
FIG. 3 is a block/flow diagram illustratively showing the construction of an accept corpus and a reject corpus in accordance with the present invention.

Referring to FIG. 3, an illustrative block/flow diagram shows building accept and reject corpora, according to the present invention. A training corpus 601 includes data that is used for training tagger 200a and translator 300a models.

The contents of training corpus 601 include both input sentences and the associated formal commands. In a natural language interface for an electronic mail application, for example, the contents of training corpus 601 may illustratively include the following:

do I have any new mail // check_new_mail( )
forward this to David // forward_message (message=current, recipient=David)
do I have any uh err // do_nothing( )
it is a nice day // do_nothing( )

The left side (before the "//" sign) includes the actual input sentences from the user, and the right side includes a corresponding correct formal command. In accordance with the present invention, some of the sentences are mapped to a "do_nothing" command, either because they are clearly out of the domain, or because they are not complete enough to form a command, etc. The "do_nothing" command is one way robustness is ensured for the natural language system 10. All of the sentences in the training corpus 601 are subjected to tagger 200a and translator 300a. Tagger 200a is functionally equivalent to tagger 200 from FIG. 1, and translator 300a is functionally equivalent to translator 300 from FIG. 1. For each sentence in the training corpus 601, the output of the translator 300a is examined by the translation checker 600. If the output is correct (i.e. the correct formal command is selected by the system which corresponds to the correct command in the training corpus), then the sentence is added to the accept corpus 602. If the output is incorrect, then the sentence is added to the reject corpus 603.

Figure 4A:
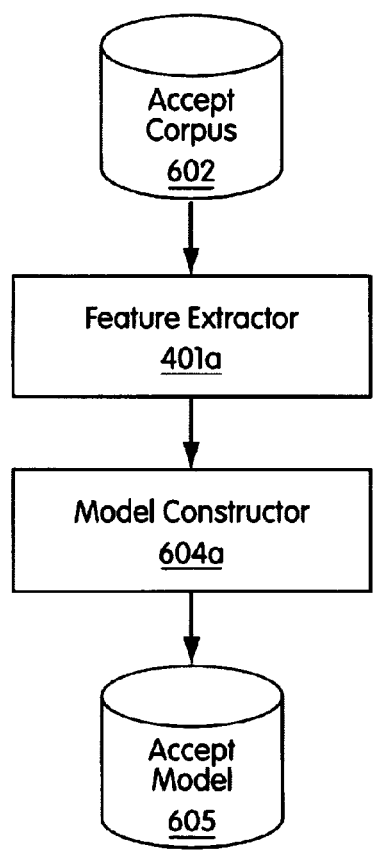
FIGS. 4A and 4B are block/flow diagrams showing a system/method for constructing accept and reject models in accordance with the present invention.
Figure 4B:
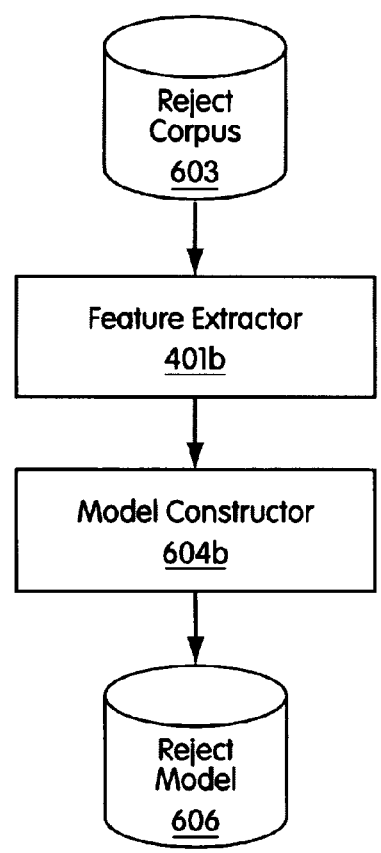

Referring to FIGS. 4A and 4B, an example of the process and system for building accept and reject models are illustratively depicted, according to the present invention. Each of the sentences in the accept corpus 602 and the reject corpus 603 are subjected to feature extractors 401a and 401b, respectively, both of which are functionally equivalent to each other. The feature extractors 401a and 401b are responsible for extracting a set of features for each sentence, and constructing a feature vector, v.

In one embodiment of the invention, the following features are used to construct the feature vector, v. All tagging scores and all translation scores from the output are included (see FIG. 2) in the feature vector, v. The next j features are the normalized cumulative do_nothing scores for taggings 1 through j, where j is the total number of taggings. The do_nothing score for tagging j could be written as $$DNS_j = \sum_{i=1}^{k_j} \frac{1}{l_{ij} + 1} \quad (1)$$

where $l_{ij}$ is the translation rank of the ith do_nothing command in tagging and $k_j$ is the number of do_nothing translations of tagging j. In the example of FIG. 2, three taggings are given. $DNS_1$, $DNS_2$ and $DNS_3$ are calculated. The do_nothing score increases when more do_nothing translations are present in a tagging or when a do_nothing translation is assigned a higher ranking in the translations of a tagging.

Another feature is a top command similarity measure, TCS. This TCS feature counts the number of formal commands that are identical to the top command of the top tagging, without considering the arguments of the command. For the example in FIG. 2, close_folder(name=FNAME) and close_folder (folder=current) would be considered identical. This feature can be written as $$TCS = \sum_{i=1}^{k} \frac{1}{k_i + 1} \quad (2)$$

where $k_i$ is the index of the ith translation that is identical to the first, and k is the number of translations identical to the first tagging.

Another feature includes a parameter mismatch feature, which measures the number of command arguments that are present in the translation of a command, but are not available in the tagging of that command. For example, in FIG. 2, where the selected formal command is close_folder (name=FNAME) and the argument FNAME maps to "message log", the parameter mismatch would be 0. On the other hand, if none of the words were tagged as FNAME then argument will be incomplete, and in this case the parameter mismatch would be 1. For commands with more than one argument, the parameter mismatch may be greater than 1.

The feature extractor 401a extracts the features and constructs the feature vector for each sentence and submits the feature vector to a model constructor 604a. Similarly, the feature extractor 401b submits the feature vector to model constructor 604b. Model constructors 604a and 604b are functionally equivalent to each other. In one embodiment of the invention, model constructor 604a computes an accept mean vector $m_A$ and accept covariance matrix $\Sigma_A$ for all the feature vectors produced by the feature extractor 401a, corresponding to all the sentences in the accept corpus 602. An accept model 605 includes the accept mean vector $m_A$, the accept covariance matrix $\Sigma_A$, and the total number of sentences $n_A$ in the accept corpus 602. Similarly, model constructor 604b computes a reject mean vector $m_R$ and reject covariance matrix $\Sigma_R$ for all the feature vectors produced by the feature extractor 401b, corresponding to all the sentences in the reject corpus 603. The reject model 605 includes the reject mean vector $m_R$, the reject covariance matrix $\Sigma_R$, and the total number of sentences $n_R$ in the reject corpus 603.

Figure 5:
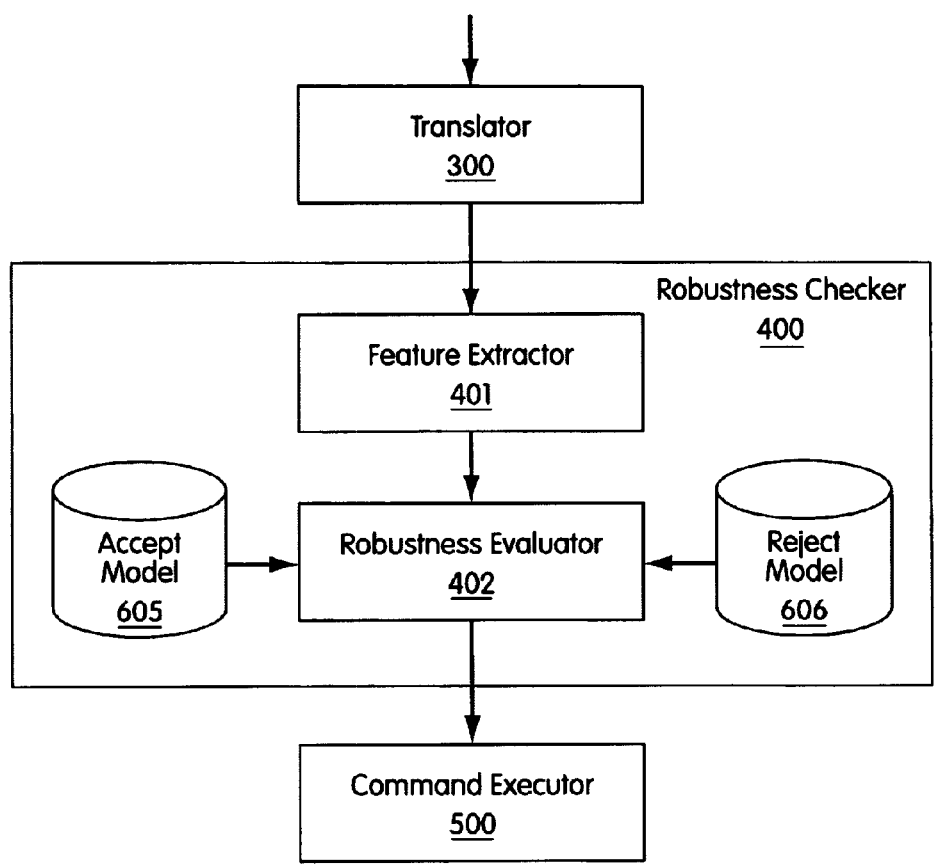
FIG. 5 is a block/flow diagram showing a robustness checker in accordance with the present invention.

Referring to FIG. 5, a robustness checker 400 is schematically shown in accordance with the present invention. Robustness checker 400 connects to translator 300. Robustness checker 400 include feature extractor 401, robustness evaluator 402, accept model 605 and reject model 606. Feature extractor 401 is functionally equivalent to feature extractors 401a and 401b described previously with reference to FIGS. 4A and 4B.

Robustness evaluator 402 is responsible for evaluating a given feature vector, calculated by feature extractor 401 using the output from translator 300 for a new sentence from the user, and determining if the corresponding formal command should be accepted (i.e. submitted for execution), or rejected.

The robustness evaluator 402 first calculates P(A), the prior probability for command acceptance, and P(R), the prior probability for command rejection. In one embodiment of the invention, P(A) and P(R) are calculated using $$P(A) = n_A/(n_A + n_R) \quad (3)$$

$$P(R) = n_R/(n_A + n_R) \quad (4)$$

where $n_A$ and $n_R$ are the number of sentences in the accept corpus 602 and reject corpus 603, respectively.

Given a feature vector v produced by the feature extractor 401, the robustness evaluator 402 calculates the conditional probabilities P(v|A) and P(v|R), using $$P(v|A) = \frac{e^{-\frac{1}{2}(v-m_A)^T \Sigma_A^{-1}(v-m_A)}}{(2\pi)^{\frac{n_A}{2}} |\Sigma_R|^{\frac{1}{2}}} \quad (5)$$

$$P(v|R) = \frac{e^{-\frac{1}{2}(v-m_R)^T \Sigma_R^{-1}(v-m_R)}}{(2\pi)^{\frac{n_R}{2}} |\Sigma_R|^{\frac{1}{2}}} \quad (6)$$

T represents the transpose operator for vector $v-m_A$ and $\Sigma^{-1}$ is an inverse matrix. The classification rule is simple. A formal command with feature vector v is accepted if:

$$P(A)P(v|A) > P(R)P(v|R) \quad (7)$$

and rejected otherwise. If the command is to be executed, then it is submitted to a command executor 500.

Variations to the classification mechanism specified by Equations (3)–(7) above will now be described in greater detail. One variation is to permit the user to modify the values of P(A) and P(R). In one embodiment of the invention, the user interface 100 (FIG. 1) permits the user to modify the values of P(A) and P(R). By changing the values of P(A) and/or P(R), users can modify the system behavior to suit desired preference. For example, it the user feels that too many commands are being rejected by the system, then increasing the value of P(A) (or equivalently, decreasing the value of P(R)) would increase the acceptance rate of the commands. An extreme case is when the value of P(R) is set to 0, where all commands will be accepted. Once the user modifies the values for P(A) and/or P(R), the classification rule of EQ. (7) is applied with the new values.

Another variation includes not using the reject model 606 at all, and basing all decisions on the accept model 605 only. With this variation, the reject model 606 is not constructed, and the formal command will be accepted if $$P(A)P(v|A) > P_{th} \quad (8)$$

where $P_{th}$ is a predetermined threshold. Determining the value for $P_{th}$ is subjective and may be defined using trial-and-error experiments or other determination techniques. The designer of the system may choose a default value for $P_{th}$ by trying out different values for $P_{th}$, and choose a value that gives a reasonable or desirable system behavior. Again, the user may be permitted to modify the value for $P_{th}$ via the user interface 100.

Figure 6A:
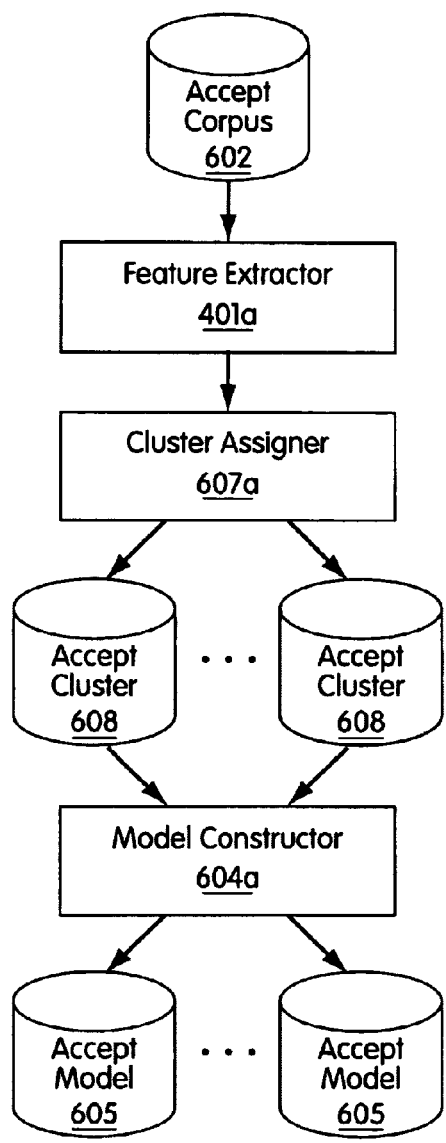
FIGS. 6A and 6B are block/flow diagrams showing a system/method for clustering accept and reject models in accordance with the present invention.
Figure 6B:
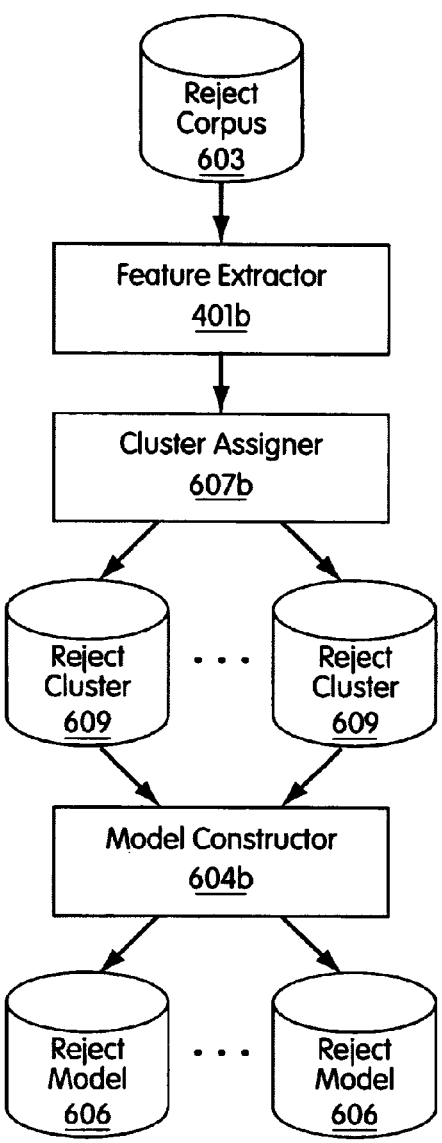

Another variation includes the use of clustered accept and reject models. Referring to FIGS. 6A and 6B, schematically illustrated is an example of a process for building clustered accept and reject models, in accordance with the present invention. In this embodiment, a plurality of accept models 605 and/or reject models 606 are employed. This embodiment may be adjusted to accommodate different sets of conditions that may lead to acceptance or rejection of a command. For example, a command may be rejected due to processing errors, e.g., because of an error made by the tagger 200 (FIG. 1) or because of an error made by the translator 300 (FIG. 1). Further, different errors may be distinguished based on the type of error. For example, the command itself could be wrong, or perhaps the command is correct but the arguments are incorrect.

The training data from accept corpus 602 is partitioned into one or more accept clusters 608 by a cluster assigner 607a which is coupled to the feature extractor 401a. A similar operation is performed for the reject corpus 603 by a cluster assigner 607b which is coupled to the feature extractor 401b. The number of clusters to be used in each case is a system parameter that needs to be selected by the designer of the system, which may be based on trial-and-error experiments or other methods.

In one embodiment of the invention, 3 clusters for both the accept clusters 608 and the reject clusters 609 (the number of clusters does not have to be the same for the accept and reject models). Assigning the data to one of the clusters can be done using rules (e.g. what kind of error resulted in the rejection), or using clustering techniques such as a K-means clustering algorithm, which is known in the art. Once the data is partitioned into the desired number of clusters, model constructors 604a and 604b construct the desired number of accept models 605 and reject models 606. Each model will have its own mean vector, covariance matrix and number of sentences. For example, if we have 3 accept models, then accept model 1 will have accept mean vector $m_{A1}$, covariance matrix $\Sigma_{A1}$ and number of sentences $n_{A1}$, and similarly for accept models 2 and 3 (and reject models as well).

Figure 7:
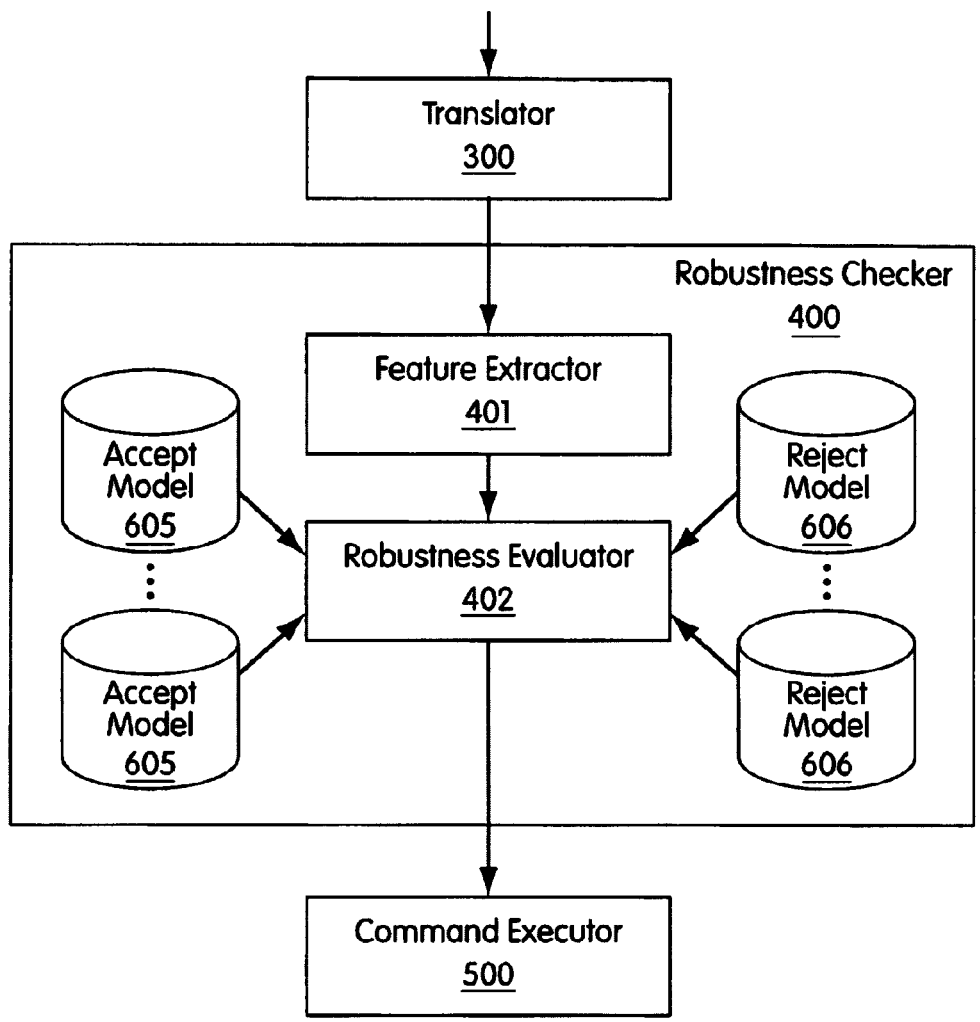
FIG. 7 is a block/flow diagram showing a robustness checker employing clustered models in accordance with the present invention.

Referring to FIG. 7, a robustness checker is illustratively shown employing clustered models in accordance with the present invention. Robustness evaluator 402 of robustness checker 400 calculates the values $P(A_j)$ for each accept model j using:

$$P(A_j) = n_{Aj}/n_{total} \quad (9)$$

where $n_{Aj}$ is the number of sentences in accept cluster j, and $n_{total}$ is the total number of sentences in all of the accept clusters and reject clusters. Similarly, robustness evaluator 402 calculates the values $P(R_j)$ for each reject model k using:

$$P(R_k) = n_{Rk}/n_{total} \quad (10)$$

where $n_{Rk}$ is the number of sentences in reject cluster k, and $n_{total}$ is the total number of sentences in all of the accept clusters and reject clusters.

Given a feature vector v produced by the feature extractor 401, the robustness evaluator 402 calculates the conditional probabilities $P(v|A_j)$ and $P(v|R_k)$ for each accept cluster j and reject cluster k, using:

$$P(v|A_j) = \frac{e^{-\frac{1}{2}(v-m_{A_j})^T \Sigma_{A_j}^{-1}(v-m_{A_j})}}{(2\pi)^{-\frac{n_{A_j}}{2}} |\Sigma_{A_j}|^{\frac{1}{2}}} \quad (11)$$

$$P(v|R_k) = \frac{e^{-\frac{1}{2}(v-m_{R_k})^T \Sigma_{R_k}^{-1}(v-m_{R_k})}}{(2\pi)^{-\frac{n_{R_k}}{2}} |\Sigma_{R_k}|^{\frac{1}{2}}} \quad (12)$$

The classification rule is as follows. A formal command with feature vector v is accepted if the $$\max(P(A_j)P(v|A_j))(\text{over all } j) > \max(P(R_k)P(v|R_k))(\text{over all } k) \quad (13)$$

and rejected otherwise. If the command is to be executed, it is submitted to the command executor 500 (FIG. 1) as described above.

The present invention presents a robustness checker that can be employed by a natural language understanding system to determine if the user's natural language input has be understood correctly by the system. The robustness checker is statistically trained using the same training data that was used to build the natural language understanding system. The robustness checker calculates a feature vector for each input from the user, compares the feature vector against a set of statistical models and determines if the input should be accepted or rejected. When the input is accepted, the command associated with the input is executed. When the input is rejected, the command is not executed, and the user may have to resubmit the input.

Having described preferred embodiments of a system and method for ensuring robustness in natural language understanding (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for ensuring robustness of a natural language understanding (NLU) system comprising the steps of:
   tagging recognized words of a command input to the NLU system to associate the command with a context;
   translating the command to at least one formal command based on the tagged words;
   determining a top ranked formal command based on scoring of the tagged recognized words and scoring translations of the at least one formal command;
   determining whether the top ranked formal command is accepted by comparing a feature vector of the top ranked formal command to representations of feature vectors stored in an accept model; and
   executing the top ranked formal command if accepted and preventing incorrect commands from execution to provide a robust NLU system.

2. The method as recited in claim 1, wherein the step of determining a top ranked formal command includes the step of ranking formal commands based on a product of scores of the tagged words and scores of translations of the at least one formal command.

3. The method as recited in claim 1, wherein the step of determining a top ranked formal command includes the step of ranking N formal commands where N is a selectable system parameter.

4. The method as recited in claim 1, further comprising the step of determining whether the top ranked formal command is rejected by comparing the feature vector of the top ranked formal command to representations of feature vectors stored in a reject model.

5. The method as recited in claim 4, further comprising the step of providing the reject model by including representations of feature vectors of formal commands corresponding to words or sentences to be rejected.

6. The method as recited in claim 4, wherein the reject model includes a cluster of models.

7. The method as recited in claim 6, further comprising the step of clustering the cluster of models based on at least one of mistakes in commands, mistakes in arguments of the command, and processing mistakes.

8. The method as recited in claim 1, further comprising the step of providing the accept model by including representations of feature vectors of formal commands corresponding to words or sentences to be accepted.

9. The method as recited in claim 1, wherein the step of determining whether the top ranked formal command is accepted includes the step of computing a probability of acceptance for the command.

10. The method as recited in claim 9, wherein the step of computing a probability of acceptance for the command includes the steps of:
    computing a probability of rejection for the command and comparing the probability of acceptance to the probability of rejection to determine if the command is to be executed.

11. The method as recited in claim 9, wherein the step of computing a probability of acceptance for the command includes the step of comparing the probability of acceptance to a threshold probability to determine if the command is to be executed.

12. The method as recited in claim 11, further comprising the step of modifying the threshold by the user.

13. The method as recited in claim 1, wherein the accept model includes a cluster of models.

14. The method as recited in claim 13, further comprising the step of clustering the cluster of models based on at least one of mistakes in commands, mistakes in arguments of the command, and processing mistakes.

15. The method as recited in claim 1, wherein the step of preventing incorrect commands, includes executing a do nothing command responsive to the incorrect commands.

16. A program storage device readable by machine, tangibly embodying a program of instructions executable by the machine to perform method steps for ensuring robustness of a natural language understanding (NLU) system, the method steps comprising:
    tagging recognized words of a command input to the NLU system to associate the command with a context;
    translating the command to at least one formal command based on the tagged words;
    determining a top ranked formal command based on scoring of the tagged recognized words and scoring translations of the at least one formal command;
    determining whether the top ranked formal command is accepted by comparing a feature vector of the top ranked formal command to representations of feature vectors stored in an accept model; and
    executing the top ranked formal command if accepted and preventing incorrect commands from execution to provide a robust NLU system.

17. The program storage device as recited in claim 16, wherein the step of determining a top ranked formal command includes the step of ranking formal commands based on a product of scores of the tagged words and scores of translations of the at least one formal command.

18. The program storage device as recited in claim 16, wherein the step of determining a top ranked formal command includes the step of ranking N formal commands where N is a selectable system parameter.

19. The program storage device as recited in claim 16, further comprising the step of determining whether the top ranked formal command is rejected by comparing the feature vector of the top ranked formal command to representations of feature vectors stored in a reject model.

20. The program storage device as recited in claim 19, further comprising the step of providing the reject model by including representations of feature vectors of formal commands corresponding to words or sentences to be rejected.

21. The program storage device as recited in claim 19, wherein the reject model includes a cluster of models.

22. The program storage device as recited in claim 21, further comprising the step of clustering the cluster of models based on at least one of mistakes in commands, mistakes in arguments of the command, and processing mistakes.

23. The program storage device as recited in claim 16, further comprising the step of providing the accept model by including representations of feature vectors of formal commands corresponding to words or sentences to be accepted.

24. The program storage device as recited in claim 16, wherein the step of determining whether the top ranked formal command is accepted includes the step of computing a probability of acceptance for the command.

25. The program storage device as recited in claim 24, wherein the step of computing a probability of acceptance for the command includes the steps of:

computing a probability of rejection for the command and comparing the probability of acceptance to the probability of rejection to determine if the command is to be executed.

26. The program storage device as recited in claim 24, wherein the step of computing a probability of acceptance for the command includes the step of comparing the probability of acceptance to a threshold probability to determine if the command is to be executed.

27. The program storage device as recited in claim 26, further comprising the step of modifying the threshold by the user.

28. The program storage device as recited in claim 16, wherein the accept model includes a cluster of models.

29. The program storage device as recited in claim 28, further comprising the step of clustering the cluster of models based on at least one of mistakes in commands, mistakes in arguments of the command, and processing mistakes.

30. The program storage device as recited in claim 16, wherein the step of preventing incorrect commands, includes executing a do nothing command responsive to the incorrect commands.

31. A natural language understanding (NLU) system comprising:
means for tagging recognized words of a command input to the NLU system to associate the command with a context;
means for translating the command to at least one formal command based on the tagged words;
a robustness checker for determining a top ranked formal command based on scoring of the tagged recognized words and scoring translations the at least one formal command, the robustness checker for determining whether the top ranked formal command is accepted by comparing a feature vector of the top ranked formal command to representations feature vectors stored in an accept model; and
a command executor for executing the top ranked formal command if accepted and preventing incorrect commands from execution to provide a robust NLU system.

32. The system as recited in claim 31, wherein the top ranked formal command is ranked based on a product of scores of the tagged words and scores of translations of the at least one formal command.

33. The system as recited in claim 31, wherein the top ranked formal command is selected from a ranked list of N formal commands where N is a selectable system parameter.

34. The system as recited in claim 31, further comprising an accept model for storing representations feature vectors of accept commands, the representations of feature vectors being employed to compare with a user input command to determine an acceptance probability of formal commands.

35. The method as recited in claim 34, wherein the accept model includes a cluster of models.

36. The system as recited in claim 31, further comprising a reject model for storing representations of feature vectors of reject commands, the feature vectors being employed to compare with a user input command to determine a rejection probability of formal commands.

37. The system as recited in claim 36, wherein the reject model includes a cluster of models.

38. The system as recited in claim 31, wherein the robustness checker includes a feature extractor for extracting feature vectors from the command.

39. The system as recited in claim 31, wherein the feature vectors include tagging scores for recognized words of a word or sentence represented by the feature vector and translation scores for formal commands associated with the word or sentence represented by the feature vector.

40. The system as recited in claim 31, wherein the feature vectors include a do nothing score associated with words and sentences, the do nothing score for indicating a probability that a do nothing command is present for associated words and sentences, the do nothing command being associated with incomplete or incorrect commands which may be input as a command.

41. The system as recited in claim 31, wherein the feature vectors include at least one of a top command similarity measure for counting identical formal commands and a parameter mismatch feature for measuring a number of command arguments in a translation of a command.

42. The system as recited in claim 31, wherein the robustness checker includes a robustness evaluator for determining whether the top ranked formal command is accepted by comparing the top ranked formal command to feature vectors stored in an accept model.

* * * * *